April 12, 1966

J. W. NELSON 3,245,289

HOLD-DOWN CLAMP ASSEMBLAGE

Filed Aug. 12, 1964

INVENTOR.
JOHN W. NELSON
BY
Meyers & Peterson
ATTORNEYS

April 12, 1966    J. W. NELSON    3,245,289
HOLD-DOWN CLAMP ASSEMBLAGE
Filed Aug. 12, 1964    2 Sheets-Sheet 2
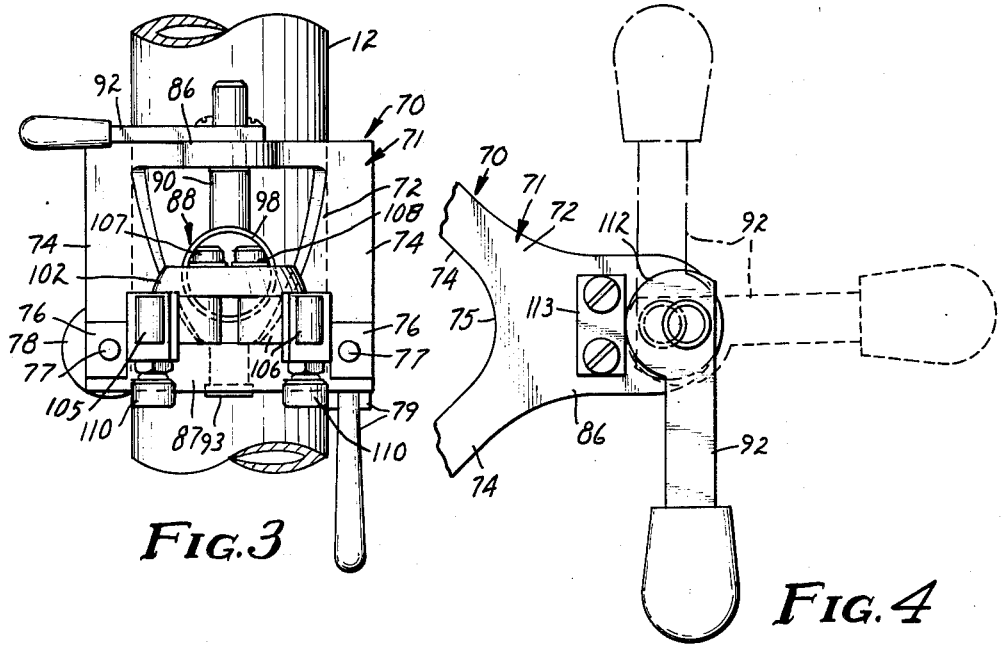
FIG. 3
FIG. 4
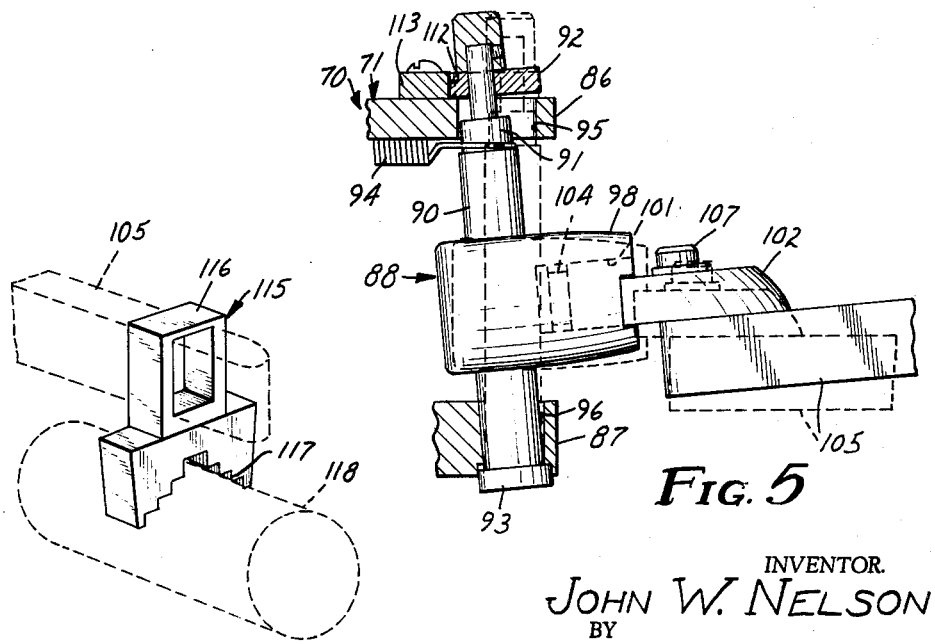
FIG. 6
FIG. 5
INVENTOR.
JOHN W. NELSON
BY
Meyers & Peterson
ATTORNEYS United States Patent Office 3,245,289
Patented Apr. 12, 1966

3,245,289
HOLD-DOWN CLAMP ASSEMBLAGE
John W. Nelson, 3226 15th Ave. S., Minneapolis, Minn.
Filed Aug. 12, 1964, Ser. No. 390,261
5 Claims. (Cl. 77—63)

The present application is a continuation-in-part of my co-pending application, Serial Number 250,693, filed January 10, 1963, and entitled "Hold-Down Clamp Assemblage," and now abandoned.

This invention relates to clamping of workpieces in a tool machine and more particularly to a hold-down assemblage for holding a workpiece while it is subject to tooling forces.

It is an important object of this invention to provide a clamp which is mounted upon a machine standard and which confronts a table top in cooperation therewith so as to exert a clamping force upon objects placed on the table and subject to working force by a machine tool.

In powered machines such as drill presses, a table is usually provided and an upright standard is rigidly secured thereto. A power mechanism is mounted on the standard above the table and a moving tool is adapted to engage work placed upon the table. Since the workpiece may vary in size, shape, and in the location of specific areas where a clamp can be applied effectively, the machinist generally holds the workpiece by hand as he advances the tool. If a tool such as a drill binds in the piece, it is apt to pull free from the machinist's grip and will then move with the tool. Sharp edged objects can be extremely dangerous and, hence, have been known to severely cut the hands of one attempting to manually hold the piece.

In the prior art there have been proposed a number of clamps designed to hold work of the character described. These devices, insofar as I am aware, are adapted to be secured at specific locations which give limited coverage of the total area even where a clamp jaw is adapted to swing through an arc. Increasing the radius of swing renders the device less stable and does not materially increase the utility of such clamp because the jaw still must swing from an adjustably fixed center.

It is within the contemplation of the present invention and a general object thereof to overcome the difficulties presented by prior art clamps and to provide a hold-down clamp which can be quickly and easily adjusted to any of a multiplicity of areas on a workpiece to securely hold the same at the required position with respect to a moving tool.

It is a further object of the invention to provide a hold-down clamping assemblage for drill presses and the like which will utilize a machine post or standard as a part of the mount and will permit strong and secure clamping at any of its adjusted positions.

A still further object of the invention is to provide a clamp which has means for coarse adjustment, both laterally and vertically, and also means for a precise adjustment for final lateral positioning and downward movement of a clamping foot to hold a workpiece against the work table.

It is still a further object of the present invention to provide a hold-down clamping assemblage for drill presses and the like which includes hold-down means adjustable vertically about a plurality of pivot axes.

These and other objects and advantages of the invention will more fully appear from the following description, made in connection with the accompanying drawing wherein like reference characters refer to the same or similar parts throughout the several views and in which:

FIGURE 3 is a front elevational view of the clamp shown in FIGURE 1;

FIGURE 4 is an enlarged plan view of the locking cam utilized in connection with the apparatus shown in FIGURE 1;

FIGURE 5 is a side elevational view of a portion of the apparatus shown in FIGURE 1, and illustrating, on an exaggerated basis, the disposition of the hold-down means between a released and a clamped form; and FIGURE 6 is a detail perspective view on an enlarged scale showing a modified hold-down shoe which may be used in connection with the apparatus of the present invention.

Figure 1:
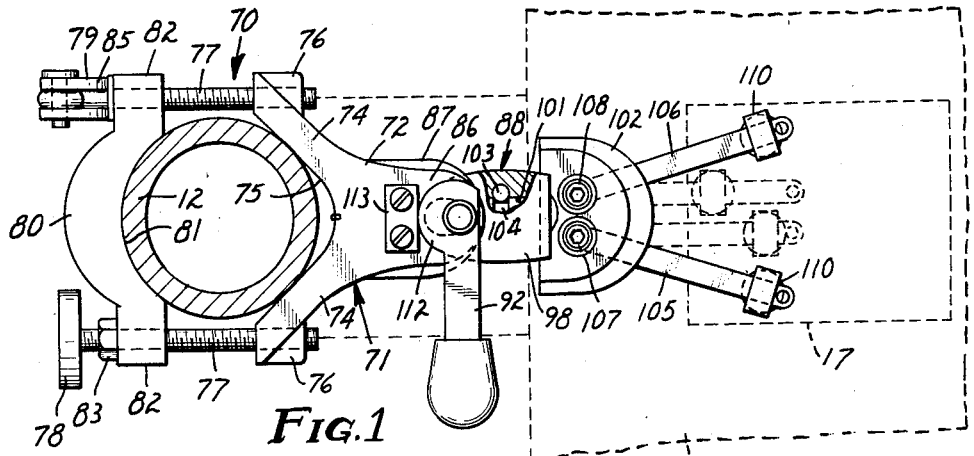
FIGURE 1 is a horizontal sectional view of a drill press standard showing a plan view of a clamp in accordance with the present invention secured thereto.

With reference to FIGURES 1–6 of the drawing, it is contemplated that the work holding clamp in accordance with the preferred modification of the present invention be utilized with a conventional machine 10 such as a drill press having the basic elements comprising a table 11, a standard 12 rigidly secured to the table and extending vertically upward therefrom, and a powered tool 13 which in the illustration shown constitutes a chuck 14 rotatably powered on a shaft 15 and having a tool such as a drill bit 16 secured therewithin. The tool 16 is adapted to be advanced toward a workpiece 17 held in proper location upon table 11 as shown.

Referring now particularly to FIGURES 1-5 the work holding clamp is illustrated generally at 70 and is adapted to be positioned or mounted on the standard 12 above the table 11. This work holding clamp comprises a mount portion for attachment to a standard and a hold-down element for attachment to the work.

Figure 2:
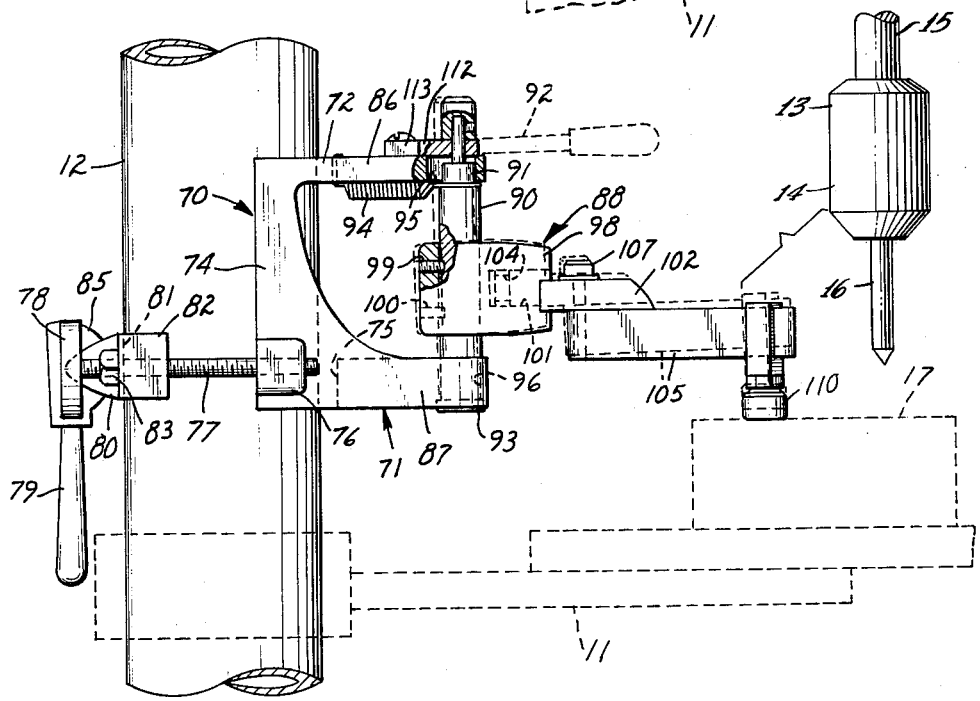
FIGURE 2 is a side elevation of the clamp shown in FIGURE 1, certain portions being shown broken away, and illustrated, in phantom, the clamp in released form are relative to the work.

With particular attention directed to FIGURES 1 and 2, the mount 71 comprises an elongated body member 72 having angulated wings or flange members 74—74 which cooperate to form a "V" shaped cradle 75 such as may accommodate the standard 12 within a diameter normally utilized in conventional machines of the class described. Each of the flanges 74 has a boss 76 into which a pair of screws 77 are respectively threaded. The screws 77 lie in parallel relation, one to another, as shown in FIGURE 1 and terminate outwardly in clamping means such as the wheel member 78 and the cam lever 79. A saddle 80 has a recessed area 81 adapted to frictionally engage the outer periphery of the standard 12 in opposed position to the V shaped cradle 75. The screws 77 pass respectively through the openings in the end portions 82 of the saddle member 80, and the cam nut 83 provides an adjustable abutment to advance the saddle 80 against the standard 12 whenever the screws 77 are sufficiently advanced. The cam lever 79 has a cam surface at 85 which is adapted to engage the surface of the saddle 80 at 82 the end area thereof. Thus, the member 79 provides relatively easy and quick release of pressure of the saddle member 80 about the standard 12.

It will be observed that the mount 70 can be frictionally secured at any of a multiplicity of position, furthermore, the mounts can be rotated arcuately through any desired radial position at any of the selected vertical heights. The positioning of the mount 70 therefore constitutes a coarse adjustment which is particularly useful in quickly clamping and unclamping identical objects which are to be consecutively worked on by the tool mechanism.

Also secured to the body member 72 are a pair of vertically spaced brackets 86 and 87 as shown in FIGURE 2 and these brackets form the linking structure for the hold-down element generally designated 88 to be described in detail hereinafter.

The hold-down element 88 permits the operator to clamp and unclamp a workpiece such as the workpiece 17 with a minimum of movement being necessary. This element per se has a substantially upright post member 90 as is clearly shown in FIGURES 2 and 5. This post has an area of reduced diameter as at 91 for facilitating assembly and attachment to the brackets 86 and 87. The cam arm 92 is retained in position adjacent to the top end of the post 90 by means of a suitable locking collar or the like, the post being free for rotation relative to the cam arm 92. A shoulder area at 93 retains the post 90 in proper relative vertical disposition within the brackets 86 and 87. Spring 94 resiliently biases the post 90 to the position shown in phantom in FIGURE 5.

As shown in FIGURES 2 and 5, the brackets 86 and 87 are bored as at 95 and 96 respectively so as to loosely retain the post 90 therein. In this connection, the diameter is sufficiently large to permit the post 90 to rockably tilt within the confines of the aligned bores 95 and 96 in order to accomplish the clamping action which will be described in detail hereinafter.

The hold-down element 88 is provided with a body member 98 which is suitably bored at 99 and 100 in order to receive locking screws which can be forced against the post 90. In this manner, the vertical disposition of the body member 98 relative to the workpiece 17 may be carefully controlled. The body member 98 is bored as at 101 in order to receive a hold-down plate or tongue 102, one end being formed as a cylindrical shaft for pivotal rotation within the bore 101. The shaft portion has a circumferential groove at 104 to receive the ball 103 in engagement therewith. Thus the plate 102 is pivotally retained within the body member 98. The plate 102 is provided with means for receiving the hold-down arm 105 and 106 in pivotal relationship therewith as at 107 and 108 respectively. The arms 105 and 106 include a foot element or the like 110 which is movable along the length and is adapted to be forced against the workpiece 17. The plate 102 may pivot about the cylindrical extension thereof in order to accommodate uneven work, when encountered. For purposes of ease in assembly, the ball 103 may be spring biased away from the groove 104. During use a substantial length of the arms 105 and 106 bear against the lower surface of the tongue 102. These arms are adapted for pivotal rotation in a horizontal plane about the screws or posts 107 and 108.

Returning now to the cam arm 92, it will be observed that this member has a cam surface as at 112 which is normally urged against the plate 113, the plate being adjustably mounted on the bracket 86 by suitable means, such as screws or the like. Thus, the pivotal disposition of the cam arm 92 together with its cam surface 112 relative to the cam plate 113 will determine the vertical disposition of the post 90. In this connection, the disposition of the arm 92 in FIGURE 1 illustrates the disposition of the post as it is urged outwardly to force the hold-down mechanism downward. FIGURE 4 illustrates the function of this mechanism in various situations.

In order to operate this modification of the hold-down assembly of the present invention, the operator positions the workpiece 17, as desired, on the surface of the table 11. The hold-down apparatus is then positioned vertically along the surface of the standard 12 and locked in place thereon, in accordance with the coarse adjustments which may be made in this manner. The fine vertical adjustment may then be made if necessary by securing the hold-down member 88 on the post by means of the locking screws 99 and 100. With the hold-down assembly in reasonably firm contact with the work at this point, the cam arm 92 is then rotated in a clockwise direction in order to move the post 90 to a more vertical disposition, this action forcing the remaining portion of the hold-down assembly to move arcuately downwardly in a clockwise direction against the surface of the work.

Attention is now directed to FIGURE 6 of the drawings wherein a modified shoe element 115 is illustrated. For convenience, this shoe is provided with a collar or the like as at 116 to be received on one of the arms, such as for example the arm 105. The lower portion of the shoe 115 has a depth saddle-like arrangement as at 117 in order to accept cylindrical elements of varying diameter such as the element 118 therewithin. Obviously, this type of shoe may be utilized in connection with the hold-down assembly shown in FIGURES 1-5 of the drawings.

It will, of course, be understood that various changes may be made in the form, details, arrangements, and proportions of the parts without departing from the scope of my invention as set forth in the appended claims.

What is claimed is:

1. A work holding clamp for a machine having a table, a standard rigidly secured thereto and a powered tool mounted on the standard for movement with respect to the table, said work holding clamp comprising:
    (a) a mount having means adapted for securing the same at a vertically and radially adjusted portion on the standard,
    (b) a hold-down element having an upright portion secured to said mount along a substantially vertically disposed mounting post arranged for rockable motion within said mount, said hold-down element including cam means operatively associated with said post for controlling the rocking motion of said post, and further having a clamping portion secured to said upright portion in radially outward extension therefrom and being swingable with respect to the axis thereof, and
    (c) means for adjustably raising and lowering said clamping portion along the axis of said upright portion and with respect to said mount.

2. A work holding clamp for a machine having a table, a standard rigidly secured thereto and a powered tool mounted on the standard for movement with respect to the table, said work holding clamp comprising:
    (a) a mount having means adapted for securing the same at a vertically and radially adjusted position on the standard,
    (b) a hold-down element having a substantially vertically disposed post mounted for rockable pivotal motion within said mount and in spaced generally canted relation to said standard, and
    (c) said hold-down element having cam means operatively associated with said post and adapted to pivotally force said hold-down element toward said table, and further having a clamping portion secured to said upright portion in radially outward extension therefrom and being rotatable about a substantially horizontal axis.

3. A work holding clamp for a machine having a table, a standard rigidly secured thereto and a powered tool mounted on the standard for movement with respect to the table, said work holding clamp comprising:
    (a) a mount having means adapted for securing the same at a vertically and radially adjusted position on the standard,
    (b) a hold-down element having an upright portion secured to said mount, along a substantially vertically disposed mounting post arranged for rockable motion within said mount, and being in spaced relation to said standard, and along a certain first axis,
    (c) a retaining plate pivotally secured to said upright portion and having clamping means secured thereto, said retaining plate being rotatable about a second axis disposed substantially normal to said first axis, said clamping means being pivotal about a third axis through said plate and substantially parallel to said first axis, and
    (d) cam means for rocking said upright portion within said hold-down element for adjustably raising and lowering said clamping portion with respect to said mount.

4. The work holding clamp as defined in claim 3 being particularly characterized in that said clamping means includes a plurality of elongated arms.

5. The work holding clamp as defined in claim 4 being particularly characterized in that each of said elongated arms is pivotal about a discrete separate axis.

References Cited by the Examiner

UNITED STATES PATENTS

| | | | |
|---|---|---|---|
| 162,866 | 5/1875 | Squire | 77—63 |
| 2,269,727 | 1/1942 | Mead | 77—63 |
| 2,271,532 | 2/1942 | Allmendinger | 77—63 |
| 2,430,900 | 11/1947 | Wetzler | 77—63 |
| 2,486,638 | 11/1949 | Eshleman | 77—63 |
| 2,613,557 | 10/1952 | Pricer | 77—63 |
| 2,637,226 | 5/1953 | Clark | 77—63 |
| 2,866,367 | 12/1958 | Wilkes | 77—63 |

FOREIGN PATENTS 769,004   2/1957   Great Britain.

WILLIAM W. DYER, Jr., *Primary Examiner.*

FRANCIS S. HUSAR, *Examiner.*